United States Patent

[11] 3,601,602

[72] Inventor Willis R. Smith
Rochester, N.Y.
[21] Appl. No. 844,350
[22] Filed July 24, 1969
[45] Patented Aug. 24, 1971
[73] Assignee General Signal Corporation
Rochester, N.Y.

[54] SYSTEM FOR MONITORING TRAIN OPERATION
17 Claims, 20 Drawing Figs.

[52] U.S. Cl. .......... 246/124, 246/122
[51] Int. Cl. .......... B61l 25/02
[50] Field of Search .......... 246/122, 123, 124

[56] References Cited
UNITED STATES PATENTS
2,693,525 11/1954 Kendall et al. .......... 246/124
3,470,370 9/1969 Landow .......... 246/122

*Primary Examiner*—Evon C. Blunk
*Assistant Examiner*—I. Kenneth Silverman
*Attorneys*—Forest B. Hitchcock and Harold S. Wynn ABSTRACT: Monitoring apparatus is located on each locomotive which apparatus is distinctively actuated each time that locomotive passes a track switch in the track layout. Such actuation is dependent upon whether the locomotive passes the track switch in its normal or reverse position. The elapse of time also acts on the monitoring apparatus together with the change in the direction of locomotive movement. These distinctive conditions stored in the locomotive monitoring apparatus are fed into a computer which compares the recorded locomotive movements with a standard of operation for that area of railroad and gives a written record of the actual locomotive performance. In the event the actual performance deviates substantially from a standard of performance, such difference is printed on the written record to be brought to the attention of the operator of the locomotive as well as his management. In a modified form of the invention, the conditions detected on the locomotive are transmitted to the central office in real time and are supplied to the computer for immediate processing. The computer in addition to supplying a typed record of performance also provides control of a currently updated display panel for showing the route and times of locomotive movement.

FIG. 1A TRAIN
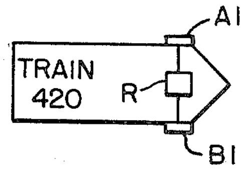
FIG. 1B TRAIN
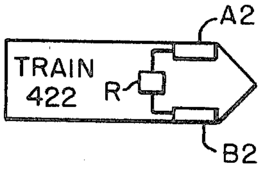
FIG. 1C TRACK LAYOUT
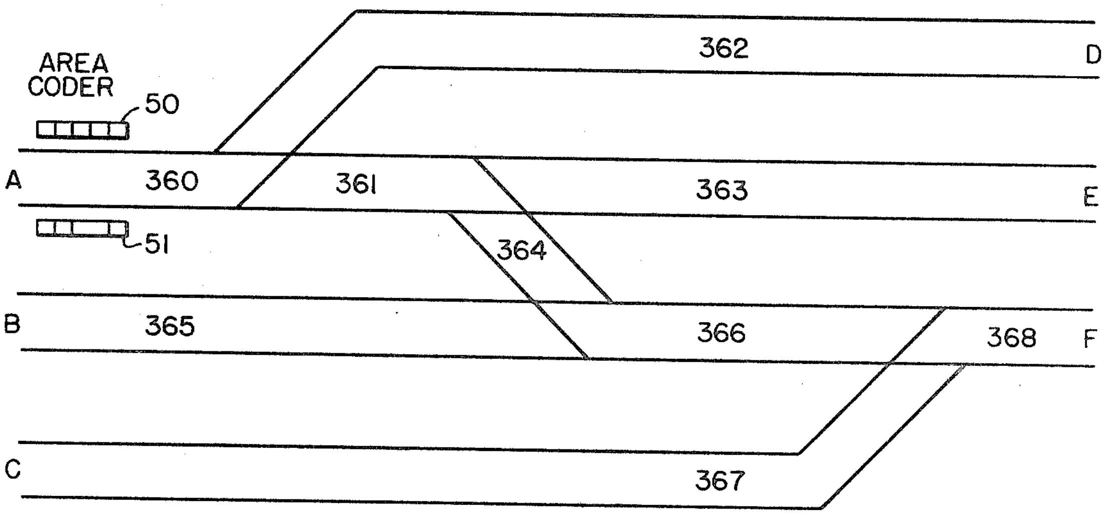
FIG. 1D TYPICAL TAPE FOR TRAIN 420 IN ROUTE A TO E OF FIG. 1C
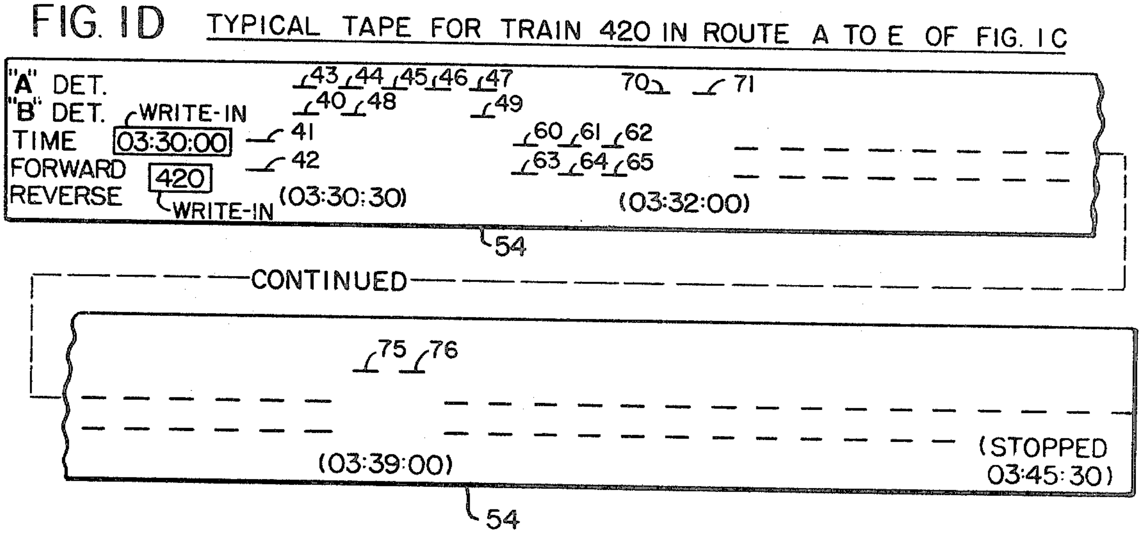
INVENTOR.
W. R. SMITH
BY Forest B. Hitchcock
HIS ATTORNEY FIG. 1E MODIFIED TRACK LAYOUT
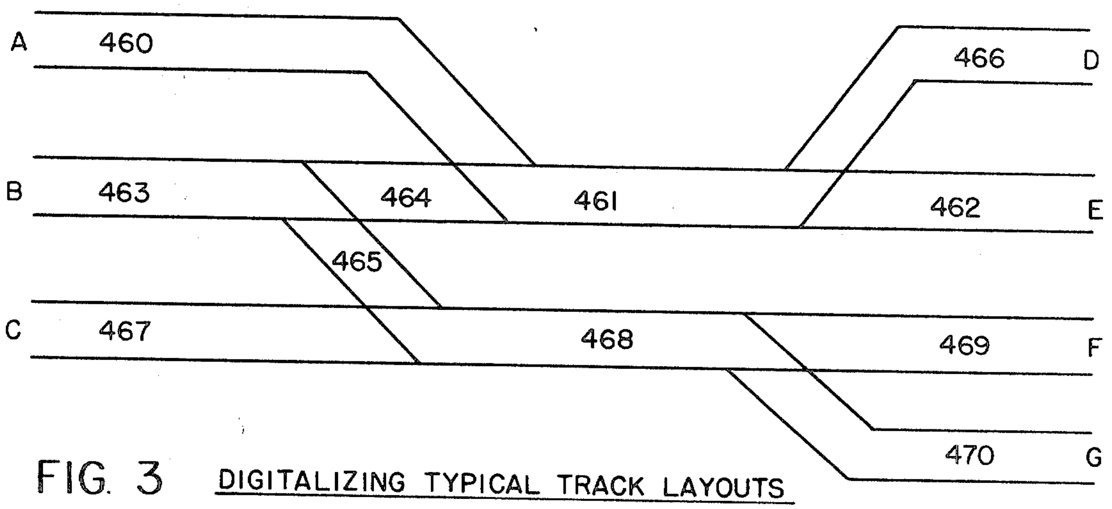
FIG. 3 DIGITALIZING TYPICAL TRACK LAYOUTS
| | DIRECTION | LAYOUT SYMBOL | BASIC SUB-ROUTINE NUMBER | NUMBER OF LAYOUT | SUB-ROUTINE NUMBER |
|---|---|---|---|---|---|
| 1. ALL TRAILING POINT MOVES | → ← | 0 / 0 | 860 | 0 | 860 |
| 2. FACING POINT MOVE | → | 1 | 860 | 1 | 861 |
| 3. F. P. M. | → | 2 | 860 | 2 | 862 |
| 4. F. P. M. | ← | 3 | 860 | 3 | 863 |
| 5. F. P. M. | ← | 4 | 860 | 4 | 864 |
| 6. F. P. M'S. | → ← | 5 | 860 | 5 | 865 |
| 7. F. P. M'S. | → ← | 6 | 860 | 6 | 866 |
| 8. F. P. M'S. | → ← | 7 | 860 | 7 | 867 |
| 9. F. P. M'S. | → ← | 8 | 860 | 8 | 868 |
INVENTOR.
W. R. SMITH
BY Forest B. Hitchcock
HIS ATTORNEY

INVENTOR.
W. R. SMITH
BY
HIS ATTORNEY

FIG. 4A COMPUTER ADDRESSES

| NO.00 TRAIN | NO. 0 TRACK SECTION | NO. 1 ← SENSE "B" | NO. 2 ← SENSE "A" | NO. 3 → SENSE "A" | NO. 4 → SENSE "B" | NO. 5 LAY-OUT | NO. 6 TIME |
|---|---|---|---|---|---|---|---|
| 000 | 360 | 000 | 000 | 361 | 362 | 1 | 00:00:00 |
| 000 | 361 | 000 | 360 | 364 | 363 | 2 | |
| 000 | 362 | 360 | 000 | 000 | 000 | 0 | |
| 000 | 363 | 361 | 000 | 000 | 000 | 0 | |
| 000 | 364 | 000 | 361 | 000 | 366 | 0 | |
| 000 | 365 | 000 | 000 | 366 | 000 | 0 | |
| 000 | 366 | 364 | 365 | 000 | 368 | 3 | |
| 000 | 367 | 000 | 000 | 368 | 000 | 0 | |
| 000 | 368 | 366 | 367 | 000 | 000 | 4 | |

FIG. 4B REVISED TO SHOW TRAIN 420 IN SECTION 360

| | | | | | | | |
|---|---|---|---|---|---|---|---|
| 420 | 360 | 000 | 000 | 361 | 362 | 1 | 03:30:30 |
| 000 | 361 | 000 | 360 | 364 | 363 | 2 | |
| 000 | 362 | 360 | 000 | 000 | 000 | 0 | |

FIG. 4C REVISED TO SHOW TRAIN 420 IN SECTION 361

| | | | | | | | |
|---|---|---|---|---|---|---|---|
| 420 | 360 | 000 | 000 | 361 | 362 | 1 | 03:30:30 |
| 420 | 361 | 000 | 360 | 364 | 363 | 2 | 03:32:00 |
| 000 | 362 | 360 | 000 | 000 | 000 | 0 | |

FIG. 4D REVISED TO SHOW TRAIN 420 IN SECTION 363

| | | | | | | | |
|---|---|---|---|---|---|---|---|
| 420 | 360 | 000 | 000 | 361 | 362 | 1 | 03:30:30 |
| 420 | 361 | 000 | 360 | 364 | 363 | 2 | 03:32:00 |
| 000 | 362 | 360 | 000 | 000 | 000 | 0 | |
| 420 | 363 | 361 | 000 | 000 | 000 | 0 | 03:39:00 |

INVENTOR.
W. R. SMITH
BY Forest B. Hitchcock
HIS ATTORNEY

FIG. 5 FLOW CHART
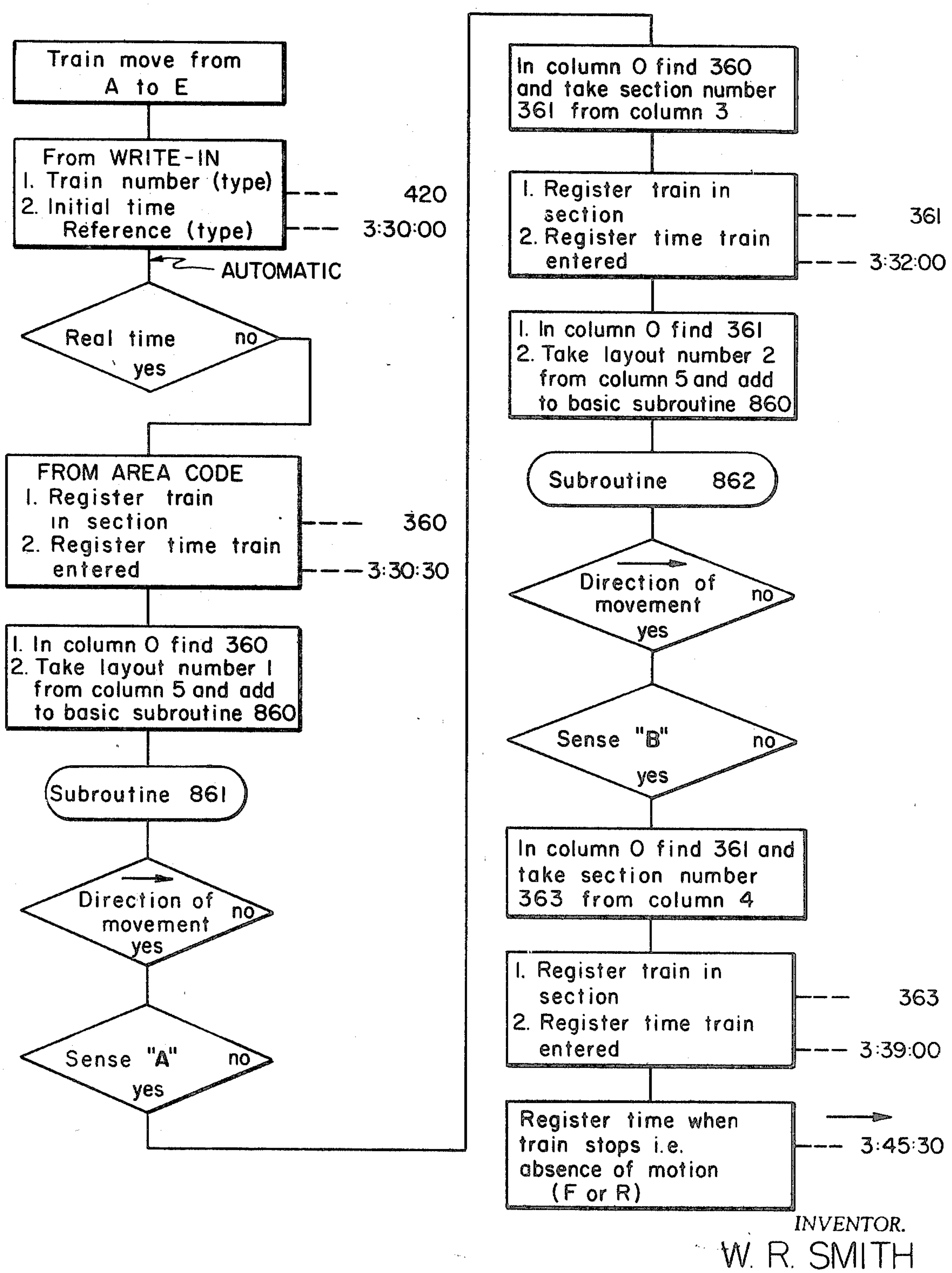
INVENTOR.
W. R. SMITH
BY Forest B. Hitchcock
HIS ATTORNEY INVENTOR.
W. R. SMITH
BY Forest B. Hitchcock
HIS ATTORNEY FIG. 7 DISPLAY PANEL FOR REAL TIME
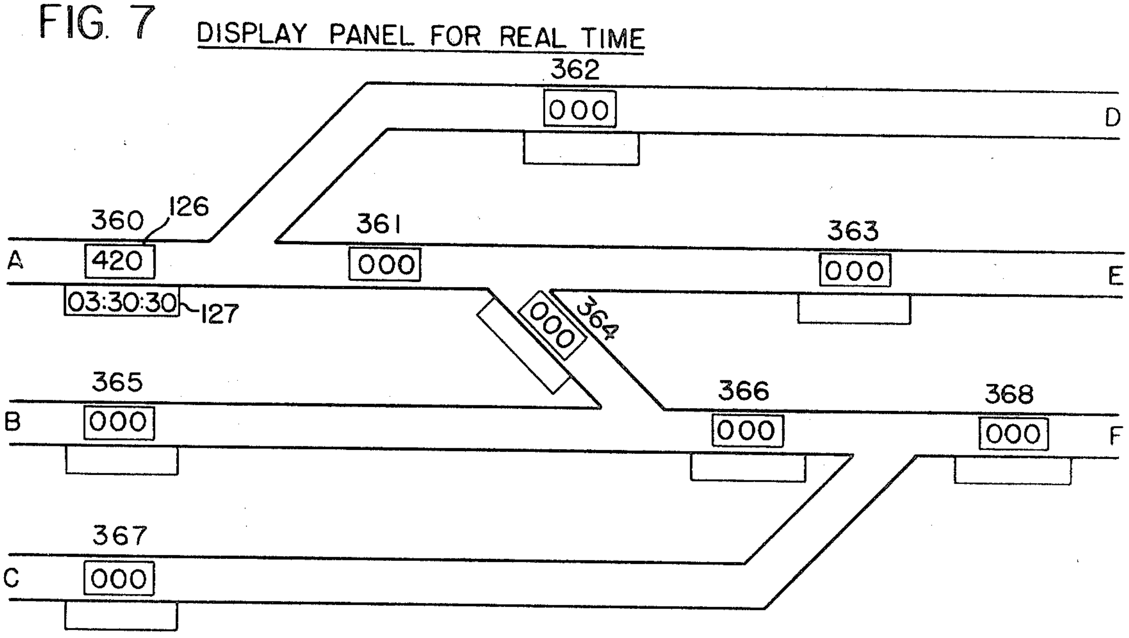
FIG. 10 TYPICAL REAL TIME TRANSMISSION
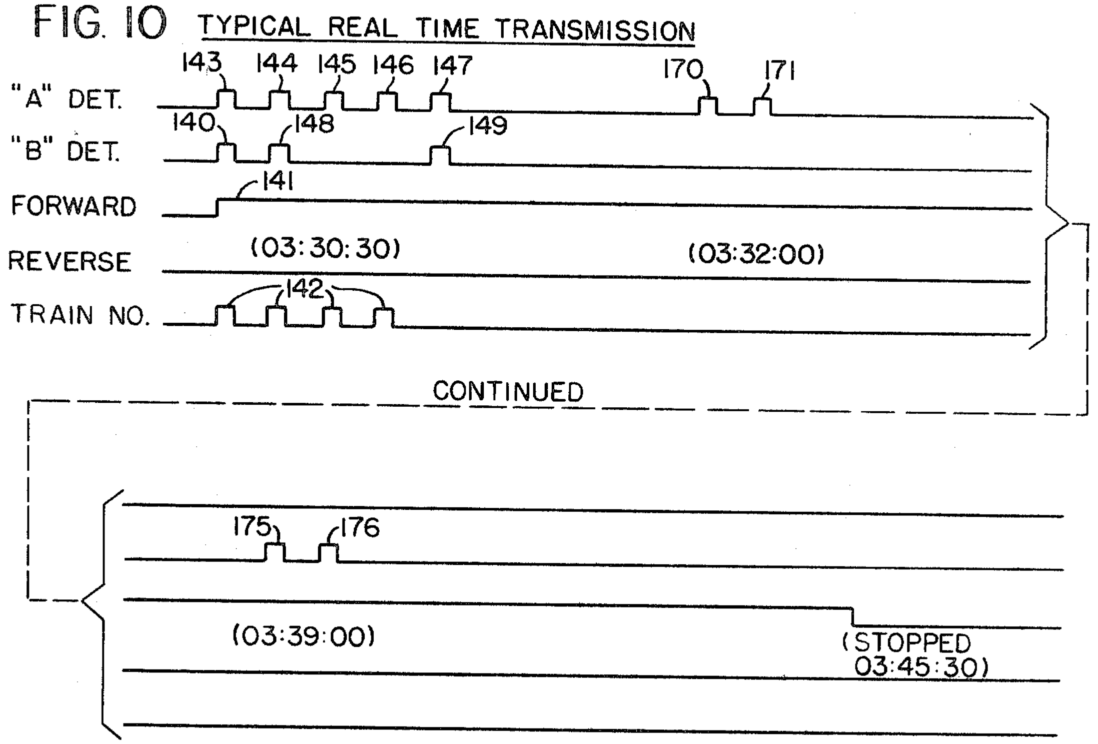
INVENTOR.
W. R. SMITH
BY Forest B. Hitchcock
HIS ATTORNEY FIG. 8A LOCOMOTIVE, FIG. 8B CENTRAL OFFICE
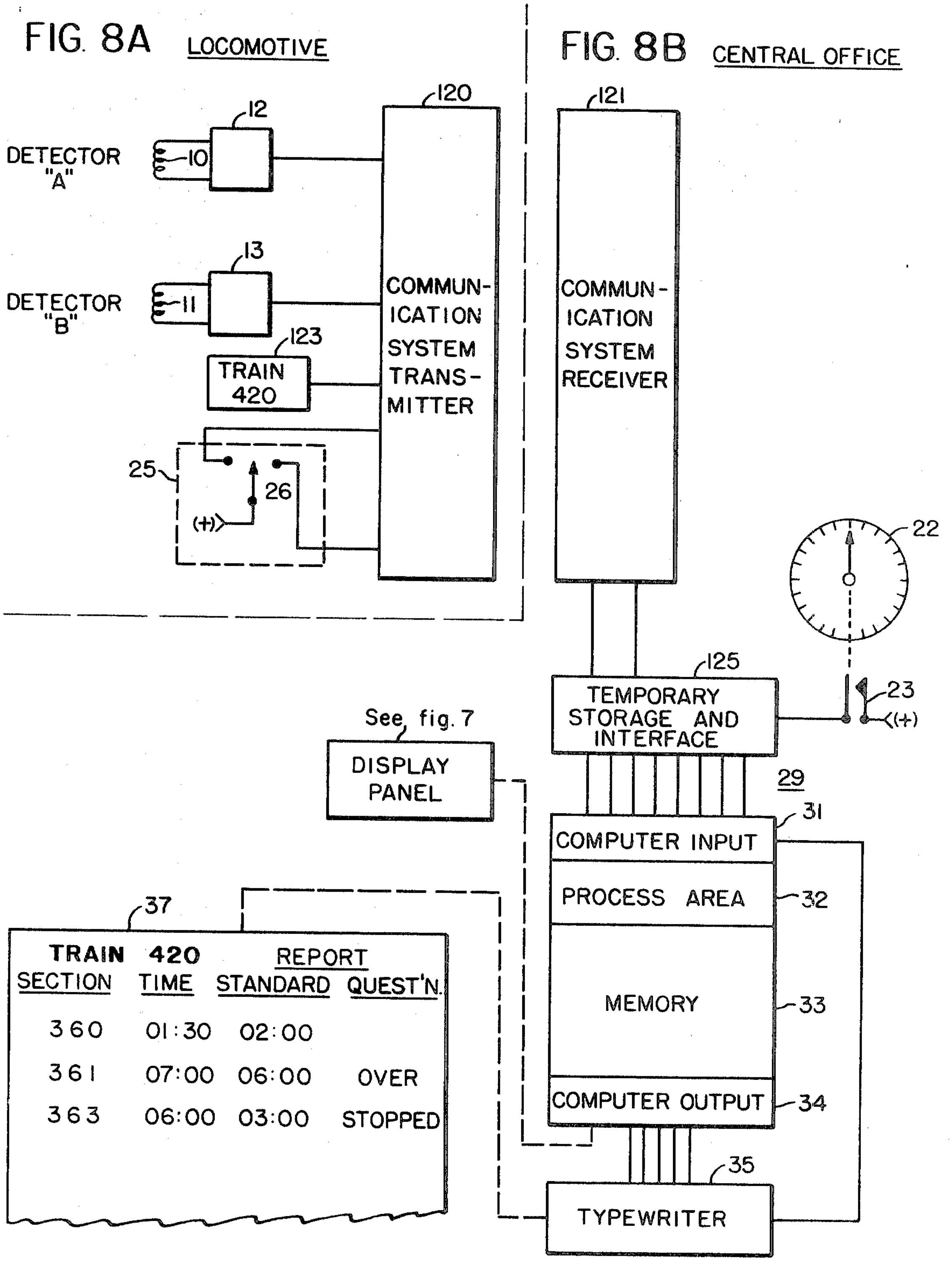
INVENTOR.
W. R. SMITH
BY Forest B. Hitchcock
HIS ATTORNEY INVENTOR.
W. R. SMITH
BY Forest B. Hitchcock
HIS ATTORNEY

SYSTEM FOR MONITORING TRAIN OPERATION

BACKGROUND OF THE INVENTION

This invention is a system for monitoring locomotive operation, and more particularly relates to a system wherein certain basic information is obtained on a locomotive relative to its movements through switch layouts and over an extensive route, which information acts on a computer for making a comparison between actual performance and a standard performance and for making a printed record of such information.

In prior systems, the progress of a train through various track routes is indicated by use of track circuits or other wayside devices with the pickup points acting as the identifiers of the locations. Indications are then transmitted to a central office for distinctively indicating the location of the train and its passage through the routes designated for its travel. Regardless of whether direct wire communication or coded type systems are employed, such systems are required to extend to all wayside locations. Such a system of indicating the location of the train is really for the information of the central office operator for directing the movement of the train from control point to control point. These systems are complex and expensive; and, in themselves may make a record with regard to the train movement, but such record requires detail interpretation by an experienced person.

The present invention is directed toward the use of apparatus on a locomotive, or other type of car, for detecting identifying locations along the wayside and also detecting the passage of such locomotive, or car, through the various track switches of the layout through which it is operated. The direction of locomotive is also detected. Such information is supplied to a computer. The computer takes this information and compares it with the track layout recorded in the computer and also with a standard of performance for the particular layout. After such processing operation, the computer causes a print out operation through suitable apparatus, so that the printed information can be reviewed by the train supervisor in a manner that he can readily note any departure from schedule or unusual circumstances in the performance of the locomotive.

Such information can be recorded on the locomotive at the time of its occurrence and then processed through the computer at a later time. On the other hand, the information can be transmitted to the computer in real time and processed accordingly. In the latter instance, a modified form of the invention is provided wherein the computer also controls a display panel to illustrate on a miniature track layout the location and movement of the train from section to section. Also, the times of entry of a train into a section are displayed for the operator's information.

SUMMARY

In summary, the invention relates to a system for monitoring locomotive (or train) operation over a railroad having conventional track switches. A plurality of magnetic (or iron) detectors are located at spaced points on the locomotive for distinctively detecting the rails of a track switch during the passage of a locomotive over such track switch in either of its positions. There is also means controlled by said magnetic detectors for making a record of the route taken by the locomotive as it passes over the track switches.

The record on a tape, or otherwise, is run through a computer organization in which the track layout is stored along with the incremental standard time required for locomotive (or train) movements through the different portions (or sections) of the available routes of the track layout. The operation of the computer on such record is to provide a readable output of the actual routes and a comparison of the actual times taken with the standard times to give a record of the train performance.

Furthermore, an organization is provided to record the real times in a computer centrally located for directly controlling a display panel showing the locomotive (or train) locations and their times of arrival at such locations.

In addition to controlling the display panel, the computer also effects a printed or typed record of the locomotive (or train) performance in the railroad area under consideration.

For a better understanding of the present invention, together with the other and further objects thereof, reference is had to the following description, taken in connection with the following drawings, while its scope will be pointed out in the appended claims.

BRIEF DESCRIPTION OF THE DRAWINGS

FIG. 1A shows a diagrammatic illustration of a typical train or locomotive having the route-detecting apparatus located thereon outside the track rails;

FIG. 1B shows a diagrammatic illustration of a train or locomotive having its route-detecting apparatus located substantially over the track rails;

FIG. 1C is a typical track layout illustrating an area coder or identifier and the track sections between the various track switches;

FIG. 1D is a typical tape as produced on a locomotive or train while traveling a route from A to E in the track layout of FIG. 1C;

FIG. 1E is a typical track layout illustrating a modification of the layout of FIG. 1C;

FIG. 3 is a table digitalizing typical track layouts in their different increments for use in the computer;

FIG. 4A is an illustration of the computer addresses of a section of the computer in which the data of FIG. 3 for the track layout of FIG. 1C is incorporated;

FIG. 4B illustrates a revised condition of a portion of the data of FIG. 4A when a train is in section 360 under real-time-reporting conditions;

FIG. 4C illustrates a revised condition of a portion of the data of FIG. 4A when a train is in section 361 under real-time-reporting conditions;

FIG. 4D illustrates a revised condition of a portion of the data of FIG. 4A when a train is in section 363 under real-time-reporting conditions;

FIG. 5 is a block diagram or flow chart of the steps involved in the operation of the computer of FIG. 2B by the record tape of FIG. 1D for a train traveling a route from A to E;

FIG. 7 is a miniature display panel having its indicators controlled by the computer of FIG. 8B;

FIGS. 8A and 8B is a detector and computing system for operation in real time and including the apparatus on a locomotive and apparatus in a central office;

FIG. 10 shows a typical real time transmission of the communication system of FIGS. 8A and 8B for a train traveling a route from A to E in the layout of FIG. 1C.

Figure 2A:
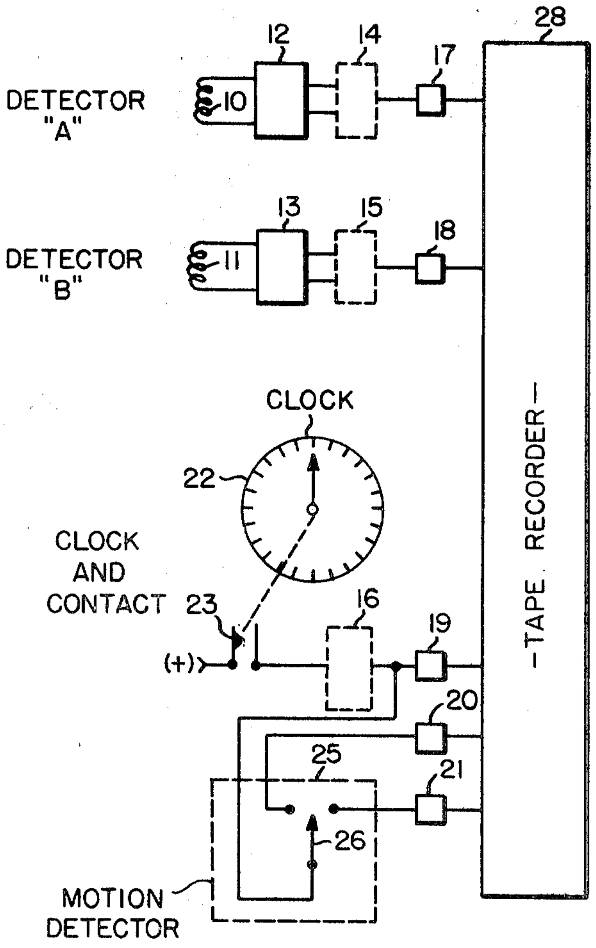
FIG. 2A is a diagram showing storage apparatus with a loop-type detector located on a locomotive or train.

In the above drawings, various illustrations include symbols for electrical connections, electromechanical devices, and mechanical organizations. These symbols are to be interpreted as representative of actual apparatus as described in the specification hereof.

For example, the FIGS. 1A and 1B illustrate symbolically different trains. A train may be locomotive and one or more cars, and in some instances can be a locomotive alone. Although locomotives themselves are specifically numbered, the movement of a locomotive and one or more cars over the railroad are given train numbers. Any locomotive can be used for a train. Thus, it is believed that the train numbers are more appropriate for use in connection with the present invention than are the locomotive numbers. However, the apparatus described herein may be located on a locomotive or on any particular car attached thereto. In brief, the terms locomotive and train as used herein may be used interchangeably as in effect meaning the same thing.

The above drawings include flow charts which are prepared by the engineers designing a system for indicating the functions to be accomplished by the computer. Such flow charts make no effort to include all of the functions of the computer which are set up in the program for the computer in machine language.

This is pointed out so that the explanation of the major function of the apparatus will be considered as supplemented in the machine language program by subsidiary instructions to effect the general functions specified.

Also, the typical codes mentioned as being transmitted in the communications system and as being recorded in certain instances are merely shown and described as illustrative of such codes, but it is to be understood that some suitable code system is employed which will transmit the desired information. The codes chosen are merely for illustrative purposes and are not intended to represent any particular system of coding.

TRAIN EQUIPMENT OF FIG. 1A

A train 420 is illustrated as comprising a locomotive or, a locomotive and one or more other cars. The magnetic detector units A1 and B1 are located at each side of train 420 and are interconnected to the recording apparatus R. The two detectors A1 and B1 are on opposite sides of the locomotive or train, and have their magnetic structures closely adjacent to the top of the rails in so far as height is concerned but are suitably spaced outwardly from the tangent tracks. These detectors A1 and B1 are at appropriate heights to cooperate magnetically to give outputs for the respective raised portions of the area coders or identifiers, and also for any track rails which they pass over.

In addition, when the train 420 carries these detectors A1 and B1 over a track switch, such as located between sections 360 and 361 of FIG. 1C, one or the other magnetic detector provides two outputs when it passes over the respective two rails not being traversed by the train. For example, if the train 420 is traveling from section 360 to section 361, the magnetic detector A1 will supply two outputs, one for each of the turn out tracks passed over. On the other hand, if the locomotive 420 of the train is passing from section 360 to section 362, the magnetic detector B1 will supply two outputs, one for each of the main tracks passed over as the train proceeds onto the turn out track into section 362.

With the above apparatus, it is apparent that the magnetic detector on one side of the car or the other will supply two successive outputs depending upon whether the train is proceeding straight through the switch or whether it is taking the turn out route.

TRAIN EQUIPMENT OF FIG. 1B

A train 422 is illustrated as comprising a locomotive, or a locomotive and one or more other cars. Magnetic detector units A2 and B2 are respectively located on opposite sides of the train; and are interconnected to the recording apparatus R. The two detectors A2 and B2 have their magnetic structures fairly close to the top of the rails in so far as height is concerned. For example, they may be located 4 to 8 inches directly over the tops of the rails. These detectors A2 and B2 are adjusted to provide little or no output when the detectors are over a normal rail, but they are adjusted to provide a distinctively higher and operative output when the detectors pass over a substantial mass of iron such as found at the frog sections of the track where track switches and crossovers are located.

Thus, when the locomotive 422 carries these detectors A2 and B2 over a track switch, such as located between sections 360 and 361 of FIG. 1C, the detector A2 supplies a single output if the train passes over the switch in the normal position; whereas, the detector B2 provides a single output if the train passes over the switch in the reverse position. It will be observed that there is no other iron mass around the track switch which has the substantial volume of iron as found in the frog section; and, for this reason only that detector supplies an output which is on the side of the train which passes over the frog section. In other words, if an eastbound train travels to the right over a switch, the left-hand detector A2 is actuated, but, if the eastbound train travels to the left over the switch, the right-hand detector B2 is actuated. This of course assumes a facing point movement over the track switch. The indications for a trailing point movement will be understood by analogy.

It is to be understood that facing point movement means, a movement in approach of a switch, wherein the switch position is unchanged by the movement of the vehicle over it, while trailing point movement is that situation when the locomotive approaches a switch, which may or may not be aligned with the direction of the approaching locomotive. For example, in FIG. 1C, the locomotive 420 may move left to right from section 360 to either section 361 or 362 depending on the alignment of the switch and the vehicle will proceed from 360 to 361 if the switch is in a normal or straight direction. If the switch is in a reverse or divergent position, the locomotive 420 proceeds from 360 to 362. If, however, the locomotive 420 is moving right to left from section 362, it only may initially proceed into section 360 over the switch. If the switch is in reverse or divergent, the switch is aligned with the route 362—361, on the other hand, if the switch is normal or nondivergent, the locomotive 420 may still proceed over the switch from section 362 to 360 by trailing the switch, when the vehicle wheels force the switch points open, if equipped with a trailing feature, and proceed against the direction of switch alignment.

TRACK LAYOUT OF FIG. 1C

The track layout of FIG. 1C provides several different routes between A, B, and C and the ends of the routes at D, E, and F. These different routes involve track switches; but, since the principles of operation here involved require only the knowledge of the section of track being occupied by a train, the track switches are unnumbered. However, the track sections of the track layout between the switches are numbered 360 through 368.

The several routes found in the track layout of FIG. 1C are taken to constitute an "area." The entrance of a train into such area is recorded by the magnetic detectors "A" and "B" picking up a code from the area coder or identifier, such as shown located adjacent to track section 360 of FIG. 1C. The area coder is also termed a magnetic inductor although it is made of inert iron parts.

Although an area coder can be located in any track section in which a train is to be considered as originally entering the supervised area, only one such area coder or identifier has been shown. Such area coder or identifier is located in the track section 360 and has inert elements 50 and 51 located on each side of the trackway for cooperation with the detecting units "A" and "B" on each passing locomotive or train. Unit 50 has a number of distinct raised portions separated by intervening depressed portions, or actual separating air spaces, to provide a distinct number of counts. The unit 51 on the other side of the track is located exactly opposite the first unit 50 and has distinctly raised portions, or actual separating air spaces, arranged in a binary code so as to distinctly identify the area. The binary code for each of such area coders is preferably selected to designate a number associated with that area.

For convenience, the track section in which the area coder is located may have its number selected, such as section 360 of FIG. 1C.

The above area coder is located in FIG. 1C so as to act upon magnetic detectors A1 and B1 located on the train shown in FIG. 1A, but, when the magnetic detectors A2 and B2 are located as shown in FIG. 1B, the sections 50 and 51 of the area coder must be closely adjacent to the track so that they will respectively affect the magnetic detectors A2 and B2. It is also to be understood that an additional detector can be located either between the rails or outside the rails, for responding to the area coder or identifier suitably located, if desired.

If an area identifier is passed while a train is traveling in one direction, the code elements are read in one order; but, if it is passed while the train is traveling in the opposite direction, the code elements are read in the reverse order. Although no means is here shown for transposing the codes thus read, it will be readily understood that means can be controlled dependent upon the direction of train movement for causing these codes to be properly transposed for recording purposes. Also, means can either be on the train or at the record analyzing location where the transposing operation can be performed by the associated computer.

MAGNETIC DETECTORS

It should be understood that any suitable type of magnetic detector can be employed as may be best suited to the practice of the present invention.

For example, a loop-type detector can be used such as described in the pamphlet entitled "LOOP VEHICLE DETECTORS," published by the General Railway Signal Company of Rochester, New York in its Pamphlet No. 1230 and copyrighted by the General Signal Corporation in 1966. Such loop detector is described in the pamphlet for use in detecting the passage of vehicles over a roadway and employs a loop of a particular size adapted to the roadway involved. However, in the present case, the loop would be substantially smaller than used for roadway vehicles. Whereas the loop for roadway vehicles would be measured in feet, the loop applied to the present invention for the detection of different masses of iron along a railroad would be measured in inches. For example, the loop would probably be in the order of 6 to 10 inches in diameter and have a number of turns depending upon the conditions of practice. The sensitivity of this loop detector would be adjusted dependent upon whether it is used as discussed in connection with FIG. 1A or whether it is used as discussed in connection with FIG. 1B. Its sensitivity adjustment and the size of the loops would vary dependent upon its usage, and dependent upon whether the same loops were intended to read the area coder as above discussed.

Another form of magnetic detector that can be employed in connection with the present invention has been shown and described in the applicant's prior application Ser. No. 771,825, filed Oct. 30, 1968. This is known as a relay-type detector and can be made very sensitive with a holding stick circuit control. Such detector readily adapts to the usage described in connection with FIG. 1A since it is very sensitive. On the other hand, it can also be adjusted so as to be adaptable to the usage described in connection with FIG. 1B.

In brief, the two forms of detectors above described are readily interchangeable and they should be considered alternative forms for the detecting elements used in the present disclosure. However, it should also be understood that other forms of magnetic detectors can also be used in place of the two forms above discussed.

DETECTION AND STORAGE SYSTEM FOR TRAIN

FIG. 2A shows a detector and storage organization for a train or locomotive. Such organization shows two loop-type magnetic detectors described above together with a tape recorder 28, a 24-hour clock 22, and a motion detector 25. The detector "A" has a loop 10 connected to its amplifier 12 which in turn supplies an output to the interlocking apparatus 14. Such apparatus then provides an output to the punch magnet 17 and causes the operation of the tape recorder 28 as later described in detail.

The detector B also has a loop 11, connected to amplifier 13, supplying an output to the interlocking apparatus 15, which in turn provides an output to the punch magnet 18 and causes the operation of the tape recorder 28.

Figure 2B:
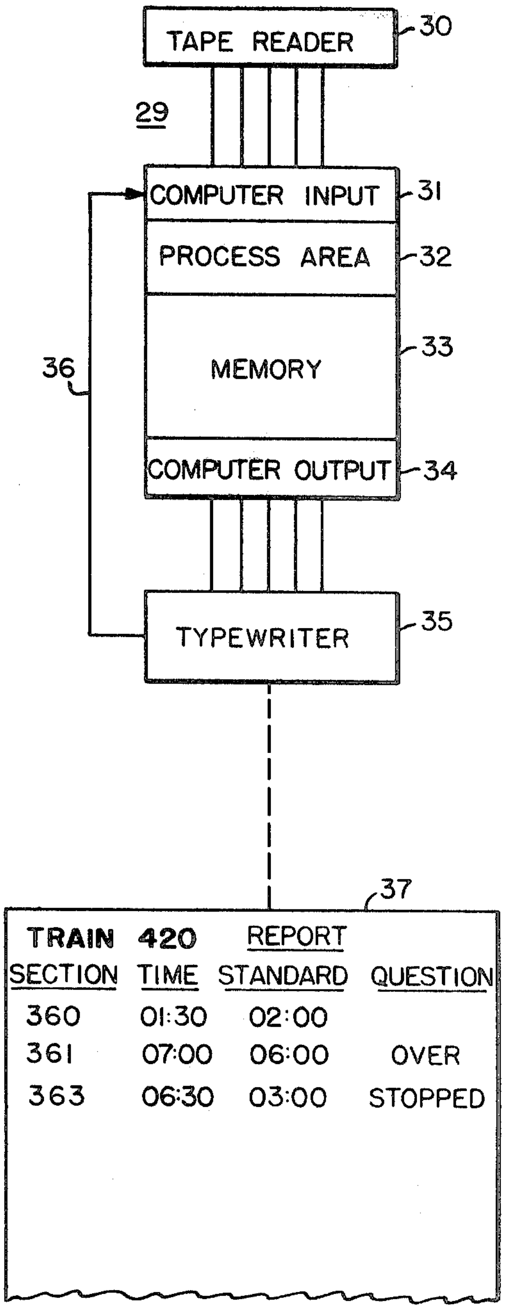
FIG. 2B is a diagram of the apparatus related to a computer for reading and interpreting the storage produced by the apparatus of FIG. 2A.
Figure 2C:
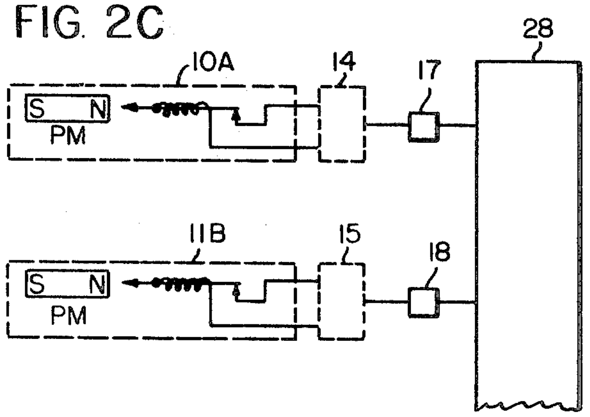
FIG. 2C is a diagram showing storage apparatus with a relay-type detector located on a locomotive or train.

These two rail detectors "A" and "B" can also be of the relay type as above discussed, and which have been shown in FIG. 2C. These relay detectors 10A and 11B are connected to their respective interlocking apparatuses 14 and 15 for actuating the respective punch magnets 17 and 18 associated with the tape recorder 28. The operation of the loop-type magnetic detector and the relay-type magnetic detector will be discussed in greater detail in connection with FIG. 6 hereinafter.

With reference to FIG. 2A, the tape recorder 28 is of the step-by-step type. Such tape recorder 28 has a mechanism arranged to operate one increment (i.e. one cycle) following each actuation of any recording magnet, such as recording or punch magnets 17, 18, 19, 20, and 21. A 24-hour clock 22 is shown as operating (i.e. closing) a 30-second contact 23 momentarily following the elapse of each 30-second period. The closure of such contact 23 supplies a direct current to the punch magnet 19 and makes a record on the tape of the recorder 28. Thus, the time line of the tape will have a succession of designations each representing 30 seconds elapsed time.

The motion detector 25 includes a device attached to a moving part of a car or locomotive which actuates a contact 26 to the right for forward movement and to the left for reverse movement; but, when there is no train movement at all, the contact 26 remains or returns to its central position, as shown. Thus, during normal operation, the punch magnet 20 or 21 may be actuated simultaneously with the punch magnet 19 at the end of each 30-second period depending upon the direction of travel. But when the train is standing still, only the clock time pulses are recorded and the punch magnets 20 and 21 are both deenergized continuously.

The motion detector 25, above described, may be of any suitable type which has a part located on a wheel or other rotatable device on a car or locomotive which distinguishes whether the locomotive is standing still or whether it is moving forward or backward. Such part provides a force or energy to give an indication of the direction of the car and correspondingly acts on the movable contact 26 which is normally biased to a central position. One general type of motion detector is shown in the Needham Pat. No. 1,571,960, dated Feb. 9, 1926. Another type is shown in German Pat. No. 1,016,798. Other electrical or mechanical equivalents can readily be employed.

In the above, it is assumed that the recorder 28 is of the punch type where a hole is punched in the tape upon the energization of a punch magnet, and a step operation of the tape follows the restoration of the punch so that the paper will not move during the punching operation. On the other hand, the tape may be of the magnetic type or the ink marker type in which the tape movement may occur during actuation of the magnet. In any event, the actuation of an operating magnet causes a suitable mark or record accompanied by the forward movement of the recording medium for one added step.

Regardless of whether the detectors "A" and "B" of FIGS. 2A or 2C are employed, the actuation of the corresponding detector as it passes over a mass of iron to which it responds causes the actuation of its respective magnet and enters a record on the recording tape of the recorder 28. This takes place regardless of whether the mounting of the detectors "A" and "B" is as described with regard to FIG. 1A or with regard to FIG. 1B. If the organization of FIG. 1A is used, then a train passing over a switch causes the appropriate detector "A" or "B" to actually detect or sense two rails which then causes two pulses to be supplied for recording. If the organization of FIG. 1B is used, then only a single mass of iron is passed and only one pulse is supplied for recording.

In any event, since these recording pulses may occur at any time, they may occur while the clock contact 23 is causing a time recordation and a stepping of the recorder. For this reason, the detecting or sensing apparatus as well as the clock contact and motion detector will pass their controls through interlocking apparatuses 14, 15, and 16 to assure that the occurrence of a change in conditions cannot interrupt a recording then in progress. On the other hand, if several of these recording conditions occur simultaneously, they can all be recorded at the same time. The interlocking organizations of 14, 15, and 16 shown in block form in FIGS. 2A and 2C are shown in detail in FIG. 6 and will be further described in connection therewith.

RECORDING OF TYPICAL TRAIN MOVEMENT

Let us assume that the train 420 of FIG. 1A is to pass through a route from A to E in the track layout of FIG. 1C. As the trainman or other person places a new tape 54 of FIG. 1D into the recorder 28 of FIG. 2A, he writes in the existing time that this takes place, such as 03:30:00 o'clock, and also inserts the train number 420. It is assumed that the 24-hour clock almost immediately causes a 30-second time mark or punch 41 to be recorded. Since the train is assumed to be in forward motion, the motion detector 25 causes a forward mark or punch 42 to be recorded by magnet 21 simultaneously with the time mark 42. Almost immediately, the train passes over the area coder within the track section 360. The stepping or counting marks 43, 44, 45, 46, and 47 are produced by coder section 50 and recorded. Also, simultaneously therewith and in accordance with its area identity marks 40, 48, and 49 are produced by coder section 51 and recorded. These are shown as marks or punches for "A" and "B" detectors along the upper edge of the tape 54 of FIG. 1D.

After recording the area code for track section 360, the time which then elapses before the train moves over the first track switch is indicated by three successive time marks 60, 61, and 62. Since the train is assumed to be moving forward, the direction marks 63, 64, and 65 occur simultaneously with respective time marks.

As such train moves over the switch out of section 360 into section 361, the detector "A" supplies two marks 70 and 71 following which added time marks and forward marks are recorded until the train moves over the next switch into section 363. At that time two marks 75 and 76 are recorded from detector "B." The train is in section 363 and continues moving and records time marks and forward direction marks on the tape 54. When the train stops, the forward direction marks cease, but the time marks continues. The train is indicated as stopping at 03:45:30.

When the tape 54 is removed from the recorder 28, the actual time the area coder has been passed can be inserted on the tape by hand. Also, the time that the switches have been passed can be inserted on the tape by hand. Likewise, the train stops can be inserted on the tape by hand. However, such hand insertions are unnecessary, although shown on the tape 54 of FIG. 1D, since the computer will automatically respond to the time marks to make a record of the appropriate times for reproducing on the typed record later to be described.

In the above description, the mounting of the detectors "A" and "B" has been assumed to be of the form shown in FIG. 1A which causes the double marks upon passing each switch; but the form of mounting described in connection with FIG. 1B can just as well be used which would result in only a single mark for each track switch. This means that its taped record would be exactly the same as shown in FIG. 1D except the second marks 71 and 76 would be omitted for each switch.

DETECTION AND RECORDER CIRCUITS OF FIG. 6

Figure 6:
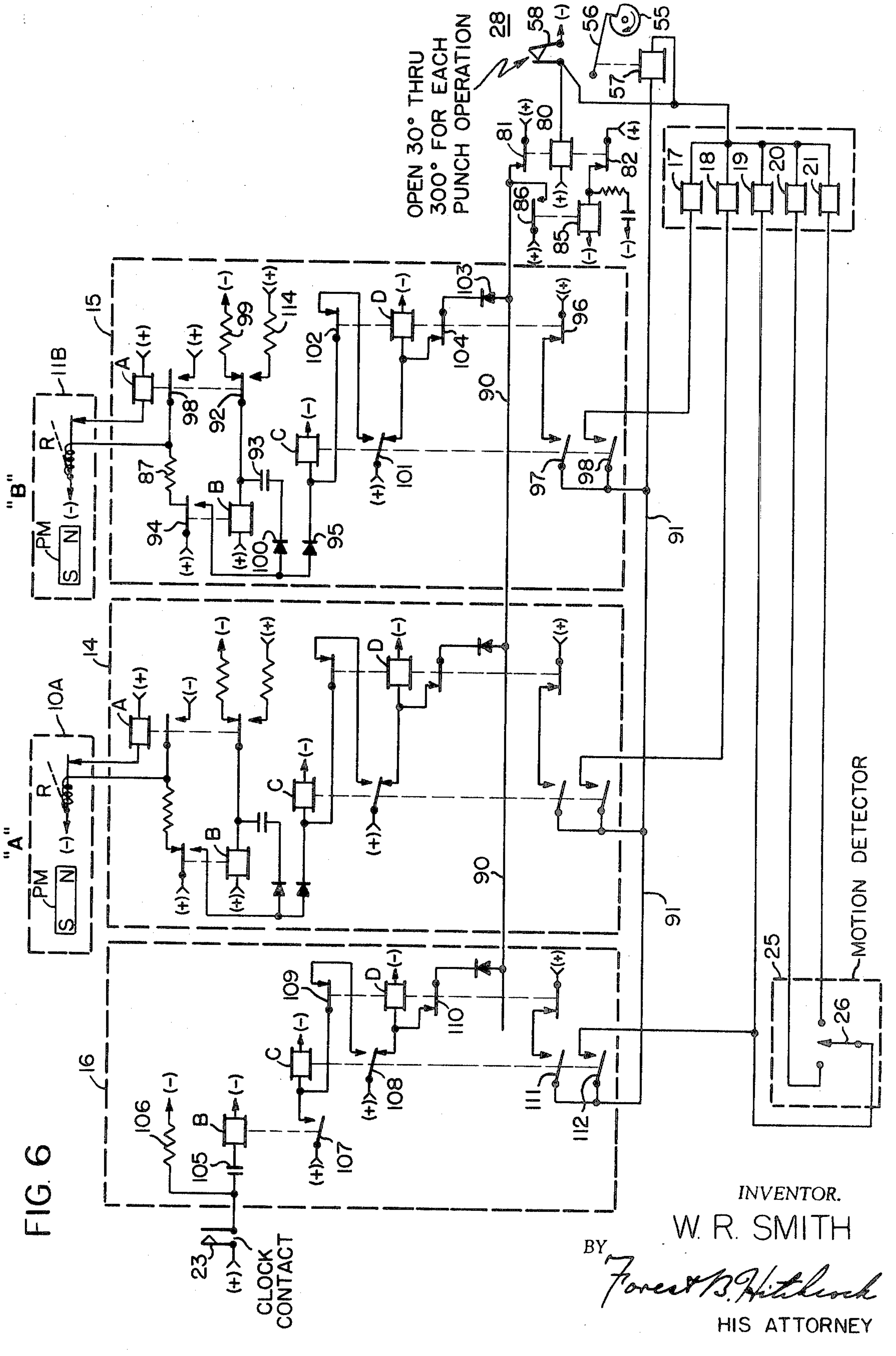
FIG. 6 is a circuit diagram of a specific form of control for the recorder of FIG. 2A or 2C.

In FIG. 6, the recorder 28 of FIG. 2A is shown in greater detail and associated with the interlocking circuits 14, 15 and 16 arranged to store the occurrences of time marks and also the detection of the passage of track switches as above discussed. This recorder 28 includes a motor drive (not shown) and a clutch so as to normally tend to operate the cam 55 in the direction of the arrow, although such cam is actually prevented from rotation by the lock arm 56 until it is released upon the energization of the recorder relay 57. When the recorder relay 57 is energized, it is maintained energized until the contact 58 of the recorder opens. This contact 58 is normally closed but opens while the cam 55 is being operated between its 30° position and its 300° position. Such opening of the contact 58 deenergizes relay 80 in turn opening its front contacts 81 and 82. Also, the opening of contact 58 removes (−) energy from recorder relay 57 as well as the magnets 17–21. The opening of front contact 81 removes energy from holding bus 90 and deenergizes those D relays which have been conditioned by their respective C relays for recording purposes.

During the time that the relay 80 is released, the relay 85 is deenergized at open front contact 82. The relay 85 is made slow releasing by a suitable shunting resistor and capacitor. However, its release time is sufficient to maintain contact 86 open for allowing the release of the relays D that may then be connected to the holding bus 90. But, relay 85 drops considerably before the reclosure of contact 58 and the completion of the rotation of cam 55. In this way the contact 86 applies energy to the holding bus 90 to maintain the storage of any mark or sensing of a rail that may occur during a recorder operation, and such storage is maintained until the next recorder initiation. In fact, the closure of contact 58 picks up the relay 80 effecting the closure of contact 81 before the closure of contact 82 can effect the picking up of relay 85 and the opening of back contact 86.

If a mark or sensing of a rail is stored by the picking up of a relay C during a recorder operation, such condition is therefore maintained and cannot effect the energization of the magnets 17–21 until the contact 58 again closes. Also, the closure of contact 58 allows the energization of relay 57 for the next recorder operation so that the recorder actually completes two (or more) operations in rapid succession without the lock arm 56 actually assuming a locking position.

In the prior description with regard to FIGS. 2A and 2C, both the loop-type detector and the relay-type detector have been described as usable for operating the recorder 28. In FIG. 6, the relay-type detector has been shown so that detailed description can be given with regard to its operation in connection with the interlocking circuit organizations 14 and 15. However, it should still be understood that this form of detector is only typical and that the loop-type detector can just as well be employed. When such loop-type detector is used, it of course includes suitable amplifiers which would have a sufficient output for operation of the relay A of the respectively interlocking circuitry 14 and 15. Also, the contact 98 on relay A would not be employed, and neither would the front contact 94 of relay B and resistor 87 be used when the loop-type detector is employed. Otherwise, the sequence of operations discussed below are exactly the same regardless of the particular type of detector connected thereto.

More specifically, detector 11B has a direct-repeating relay A in the circuitry 15 normally energized through the reed relay R within the detector 11B which is quickly released upon the passage of the detector 11B over a rail or other appropriately located metal object. The relay A has a repeater relay B which in turn supplies pickup current for control relay C. Such control relay C, when energized, closes its own stick circuit and opens the pickup circuit of the relay D. But relay D has its stick circuit connected to holding bus 90 so that it can be immediately released upon the next operation of the recorder 28 as repeated by relay 80.

Coming back to the detection or sensing of a rail by the detector 11B specifically (detector "B" in general), relay A is released and removes (−) energy from the relay B at open front contact 92 and applies a shunt around the relay B through back contact 92 and resistor 114 making relay B slightly slow release. When such relay B releases, it applies (+) energy through back contact 94 and diode 95 through control relay C, to (−). The picking up of the control relay C then applies energy (+), through front contact 96 of relay D, front contact 97 of relay C, to the operating bus 91, winding of relay 57, closed contact 58, to (−). This energizes relay 57 to open lock 56 and initiate the recorder 28 operation. Simultaneously, front contact 98 of relay C passes the same (+) energy to the magnet 17 which makes it mark or punches a hole and releases when contacts 58 open. Relay 57 initiates the recorder by operating 56 and motion of the paper begins after 30° when the magnet 17 is deenergized by opening of contacts 58.

Once the relay A is released in response to a detection or sensing of a rail or other magnetic mass, the back contact 98 of relay A applies energy to reed relay R of the detector 11B so that it is restored to an active position where it is held by the associated permanent magnet PM. This reenergizes the relay A. The closure of front contact 92 places (−) through resistor 99 to both the terminal of relay B and the capacitor 93. Thus, while the capacitor 93 is charging through back contact 94 and diode 100, the relay B does not respond; but, when the capacitor 93 is substantially charged, the positive energy (+) flows through relay B, front contact 92 of relay A, resistor 99, to (−). This causes relay B to be picked up.

When relay B picks up and closes front contact 94, energy is applied from (+) through front contact 94, resistor 87 to the winding of reed relay R. This slightly desensitizes the reed relay R by the slight energization of its winding. In brief, the permanent magnet PM has a tendency to actuate the contact of the reed relay R to a contact-making position. But when the flux is diverted through an auxiliary path including a track rail or the like, the contact of the reed relay R releases and the permanent magnet PM is of insufficient strength to actuate the reed contact. Thus, the energization through back contact 98 of relay A actuates the contact of the reed relay R to a closed position in which it is held by the permanent magnet PM. The closure of front contact 94 adds a slight holding current to the winding of the reed relay R, so that more diversion of the permanent magnetic flux by a rail is required to release the contact of the reed relay R than would be required in the absence of such holding current.

It can thus be seen that the release of the reed relay R causes a release of relay A which in turn releases relay B by which time the reed contact has operated to reenergize relay A. All of this takes place rather rapidly. However, each such cycle of events causes the energization of the relay C which stores such operation until the relay C is released upon the release of its relay D.

This picking up of relay C with relay B released as above-described, causes energy to flow from (+) through front contact 101 of relay C. front contact 102 of relay D, winding of relay C to (−). This stick circuit remains energized until the relay D is dropped away upon the initiation of the recorder and the removal of energy from the holding bus 90. This holding stick circuit for relay D can be traced from (+), through front contact 81 of relay 80, holding bus 90, diode 103, front contact 104, winding of relay D, to (−). Thus, the fact that relay C has been energized is effective to register such condition on the recorder relay 57 and on the magnet 17 which assures that it is suitably recorded.

It should be noted that the detection or sensing of a rail by detector 10A will be similarly recorded.

It is also noted that the direction contact 26 assumes a forward or reverse position while the train is in motion as previously described in connection with FIG. 2A, so that each time the clock contact 23 closes, a record is made of the time and direction of train movement or of the stopped condition of the train.

The interlocking apparatus 16 includes a relay B which is briefly or temporarily picked up by the flow of energy through clock contact 23 and capacitor 105. When the contact 23 opens, the discharge of the capacitor 105 is affected through resistor 106 sufficiently slowly as to fail to pick up relay B. Thus, relay B is only briefly or temporarily picked up regardless of the duration of the closure of contact 23.

The temporary closing of contact 107 picks up relay C of interlocking apparatus 16 which is maintained picked up by a stick circuit from (+) through front contact 108 of relay C, front contact 109 of relay D, windings of relay C, to (−). Under such conditions, the relay D is maintained held up by its stick circuit closed through contact 110 which connects it to the holding bus 90.

The picking up of the relay C closes front contact 111 and applied energy to the operation bus 91, and also to the magnet 19 through front contact 112. Also, the energy flows to either the magnet 20 or 21 depending upon the direction of the train movement. On the other hand, if the train is stopped, the time magnet 19 is energized, but neither of the magnets 20 or 21 is energized.

It will be noted that with contact 58 open between 30° and 300° for each recorder operation, the holding bus 90 has been reenergized through back contact 86 of relay 85 so that the occurrences of a picking up of any C relay will result in the holding up of its corresponding D relay until the next operation. The bus 90 is energized by contact 81 of relay 80 before contact 86 of relay 85 opens. Thus, continued energization of holding bus 90 is present at all times except for the deenergization of those relays D which had their C relays picked up at the beginning of the operation. It is to be understood that any suitable recorder may be employed, employing punch magnets or other type of recording means, and the sequences involved are appropriately corollated to the apparatuses 14, 15 and 16 to avoid the missing of a change in the detecting apparatus or the clock contact or the like.

PROCESSING THE RECORD

When the train has finished its movement through the track layout of FIG. 1C, it comes to stop which is recorded by the elimination of motion marks on the record because of contact 26 of the motion detector 25 coming to its central position. It is assumed that the trainman then takes the typical tape 54 of FIG. 1D and turns it in with his other papers relating to the train operation.

The train master's office can then process the tape 54 through the apparatus of FIG. 2B. In general, this operation includes the insertion of the tape into the tape reader 30, and using the typewriter 35 to insert the time and the train number which is initially written on the tape before it was inserted in the recorder of FIG. 2A. This is done by typing such time and train number on the typewriter 35 which records this in the computer input 31 and initiates the operation of the tape 54 through the tape reader 30.

Such tape reader 30 supplies outputs on each of its several channels to the computer input 31. These inputs are supplied from 31 to the process area 32 of the computer which acts together with the facts stored in the memory 33 to compute the various factors to be made a part of the written record and supplies these to the computer output 34. The computer output 34 then supplies the required information to the typewriter 35 which types a written report 37. This written report would have the elapsed time that the train spent in each section of the particular area. These times would be compared with the standard elapsed times. The results of such comparison would be recorded in a question column. For each elapsed time which was greater than the standard elapsed time, some suitable symbol would be typed under the column question. If the overtime or extra time required for passing through a section is a substantial character, this can be taken up with the trainman when then explains the causes for such elapse of time being made of record. Should the time be considerably shorter than the standard allotted time, it might well be possible that some tampering could have been done with the recording apparatus.

Before going into greater detail on the programming of the computer, it is desired to point out that there are some facts which need to be recorded in the computer such as the actual track layout. This is done by digitalizing the track layout and using such digits in the preparation of the program.

DIGITALIZING ACTUAL TRACK LAYOUT

The digitalizing of the actual track layout requires an assignment of numbers to the different possible combinations of switch arrangements. FIG. 3 shows different layout symbols for the various switch arrangements which are usually encountered. However, there may be others involving slip switches, and the like, which can be added by following the principles discussed.

With reference to FIG. 3, there are several columns including data characteristic of the different switches in the layouts of FIGS. 1C and 1E. The first column is for direction of train movement; the second column is a layout symbol; the third column is the basic subroutine number; the fourth column is the number of the layout; and the fifth column gives the subroutine number for each different layout.

The line 1 of FIG. 3 covers all trailing point train movements. Either direction of train movement may be used for the trailing point layout symbolized in the second column. Also, the trailing point train movement applies to both the mainline and the converging line from either the right or the left for the particular direction selected. This results in a simple symbol illustrated for all such movements.

The number of such layouts is given as (0), and this, of course, applies to all trailing point train movements and does not affect a change in the subroutine number when added thereto as shown in the fifth column of FIG. 3. For example, if a train is on section 361 of FIG. 1C, and if it moves to the left, it is a trailing point movement; but, if it moves to the right, the symbol of line 3 applies. The sum of the basic subroutine 860 plus 0 plus 2 equals 862 which is the subroutine number given to section 361.

In line 2 of FIG. 3, a facing point movement (F.P.M.) is made to the right for a switch which provides a through movement or a left-hand turnout. This is shown in FIG. 1C for a train moving to the right in section 360. Since the section 361 shows a turnout to the right for entering section 364 as well as the straight-through movement for entering section 363, the facing point move shown in line 3 is just the converse of the one shown in line 2. For example, the facing point move of line 3 is shown in section 463 of FIG. 1E where a straight-through movement into section 464 and the right-hand turnout movement is into section 465.

It is rather obvious that facing point movements may be made in the left-hand direction for switches turning either to the right or to the left as shown in lines 4 and 5 of the table. For example, such a movement as shown in line 5 can be made in FIG. 1C from section 368 straight through to section 366 or a left-hand turnout to section 367. Similarly, a movement can be made to the left as in line 4 from section 366 of FIG. 1C straight through to section 365 or a right-hand turnout into section 364.

In using these just explained symbols, the layout 3 of line 4 applies to a train in section 366 of FIG. 1C because moving to the left such train will pass over the switch in a facing point movement; but, such train in moving to the right, trails the switch into section 368 so that such trailing movement is covered by the layout 0 for trailing movements under line 1. In particular, the basic subroutine number column shows 860 for each of the layouts. The number of the layout is entered in the next column of FIG. 3. The last column includes the subroutine number selected for the particular track layout. For example, if the train is in section 366 of FIG. 1C, and moves to the right, it makes a trailing point movement so that such subroutine would be the basic number 860; but, for movement to the left, it makes a facing point movement which comes under the symbol of line 4 with layout number 3 which gives a subroutine number 863. This principle of selecting the subroutine number applies to all selections where a train in a particular section has one trailing movement and one facing point movement.

However, it will be understood that a train may be in a section such as 461 of FIG. 1E where it makes a facing point movement for either possible direction. This is shown in line 6 where layout 5 is illustrated. The converse of layout 5 could obviously be present and is shown in layout 6 of line 7.

Another combination is shown in section 468 of FIG. 1E where the switches diverge in different directions and this is illustrated in line 9 by layout 8. This layout is possible to be used in the reverse as illustrated by layout 7 of line 8.

The reason for the above will be more apparent when it is considered that the equipment of the train detects and records the passage of the switch by either the "A" or "B" detector. In addition, the direction of train movement is also detected and recorded. If a train is moving to the right over the switch symbolically illustrated in line 3 of FIG. 3 and takes the diverging route, the "A" detector will sense the passage of the switch and the direction will be to the right. This is exactly the same detection that would be provided in layout of line 2 if the train moving to the right, took the straight-through route. Thus, the way these two detections or sensing of the switch by the equipment on the locomotives is able to effect a proper record for the computer is the manner in which the actual track layout of FIG. 1C, is recorded in the computer. This will be discussed in considering FIG. 4A and the computer addresses found therein which employs the digitalizing of the track layout combinations as shown in FIG. 3.

COMPUTER ADDRESSES

With reference to the track layout in FIG. 1C, the computer addresses for the various track sections are shown in FIG. 4A. In column No. "0" the various track sections of FIG. 1C are listed each in a separate row of the computer recording or memory apparatus. The column No. "00" is used for posting the train number under real time operation later described. Columns Nos. 1 through 4 are for listing the sections which are selected by the sensing of "A" or " B" detector for the directions of train movement indicated.

Column No. 5 lists the layout number as found from FIG. 3 above discussed. Column No. 6 is used for posting the time of entrance of a train into the corresponding section given in Column No. "0" under real time operation later described.

The column No. "0" lists the track section 360 which is found in FIG. 1C as connected with track section 361 and 362 depending upon the position of the switch. If the train proceeds to the right into track section 361, the detector "A" senses the passage of the switch. Thus, the 361 is placed in column No. 3. If the train proceeds to the right into section 362, then the detector "B" senses the switch and 362 is placed in column No. 4. Since the train in 360 is not shown as being able to enter any other track section, the columns Nos. 1 and 2 have zeros placed in them.

Track section 361 permits the passage of a train to the right into sections 363 and 364. Since the movement from section 361 into section 363 is sensed by detector "B," 363 is placed in column No. 4. Since movement of the train into section 364 is sensed by detector "A," 364 is placed in column No. 3. If the train should move from section 361 to the left into section 360, its detector "A" would sense the switch. For these reasons, 360 is placed in column No. 2.

If a train in section 362 moves to the left into section 360, the detector "B" senses this so that 360 is placed in column No. 1. Since the train cannot move from section 362 to any other section, zeros are placed in column Nos. 2, 3 and 4.

A train in section 363 can move to the left into section 361 with its detector "B" sensing the passage of the switch. Thus, 361 is placed in column No. 1, zeros are placed in columns Nos. 2, 3 and 4.

A train on section 364 can move to the left into section 361 with the detector "A" sensing such movement so that 361 is placed in column No. 2. The movement of such train to the right from section 364 into section 366 is sensed by detector "B" so that 366 is placed in column No. 4.

A train in section 365 can move to the right into section 366 with its detector "A" sensing the passage of the switch. Thus, 366 is placed in column No. 3.

A train in section 366 can move to the right and enter section 368 with its detector "B" responding to the passage of the switch. Thus, 368 is placed in column No. 4.

Also, such train in section 366 can move to the left into section 364 and 365. Since the train is sensed by detector "A" in moving into section 365, such number 365 is placed in column No. 2. The movement of the train to the left into section 364 is sensed by detector "B," so that 364 is placed in a column No. 1.

A train in section 367 can move to the right into section 368 with its detector "A" sensing the passage of the switch. Thus, 368 is placed in column No. 3.

A train in section 368 can move to the left to either section 366 or section 367. Movement into section 367 would be sensed by detector "A" so that 367 is placed in column No. 2. Movement of the train into section 366 would be sensed by detector "B" so that such 366 is placed in column No. 2.

The above train movements to the right and left are assumed to be without trains 420 and 422 being turned around. This is the same as a train would actually shift back and forth during a regular switching operation. This is mentioned, because, if the train were actually turned around as on a turntable or the like, the detectors sensing the switches would be different than those named above.

The column No. 5 has the layout numbers recorded for each track section listed in column No. "0." These layout numbers are selected as above explained, in connection with FIG. 3, and are recorded here for use by the computer for selecting the various subroutine programs in processing the data received from the train record.

FLOW CHART

A flow chart is shown in FIG. 5 for the train movement from A to E in FIG. 1C as recorded on tape 54 of FIG. 1D. This flow chart shows various factors which need to be taken into consideration as the tape 54 is processed in the computer 29 of FIG. 2B.

Let us assume that the tape 54 of FIG. 1D is mounted in the tape reader 30 of FIG. 2B. The operator of the computer organization 29 of FIG. 2B then types the train number 420 into the record by typewriter 35 which supplies such information to the input 31 over connection 36. Following this, the initial time reference 03:30:00 is also typed into the record over connection 36. When this is completed, the system operates automatically to read the rest of the tape by operation of the tape reader 30 supplying inputs to the computer input 31. These typed and automatic inputs then cause the computer 29 to operate as graphically shown in the flow chart of FIG. 5.

Although the flow chart of FIG. 5 is believed to be self-explanatory, it should be noted that the train number 420 can be posted in FIG. 4A in line one column No. 00 for section 360; and the time 3:30:30 can be posted in line one column No. 6. The number 1 can be taken from column No. 5 for section 360 and added to the basic routine number 860 to give the subroutine 861 of FIG. 5.

As the operations for subroutine 861 are performed, the train number 420 is posted in FIG. 4A column No. 00 for section 361 together with the time of 3:32:00 in column No. 6.

It should be noted that each track section is allotted a standard time for a train to use that track section. For example, section 360 is allotted two minutes; section 361 is allotted 6 minutes; and section 363 is allotted 3 minutes. Thus, when the time has been entered for section 361, the time for section 360 is subtracted from it which gives 1 minute and a half. When this minute and a half is compared to the standard time of 2 minutes for section 360, the actual elapsed time for train operation is less than the time allotted for such operation. Thus, there is no comment to be supplied by the computer output 34 into the typewriter 35 for typing under the heading "question" of the report 37 of FIG. 2B.

Similarly, the subroutine 862 enters the times and causes the subtraction of 3:32:00 from 3:39:00 which gives 7 minutes. This elapsed time for train operation is greater than the standard allotted 6 minutes so that the computer 29 in making the comparison causes the computer output 24 to so control the typewriter 35 as to write "over" under the heading "question" on the report 37 of FIG. 2B.

It will be noted that the flow chart of FIG. 5 does not show the detailed operations required of the computer 29 for each subroutine. For example, the subroutines can cause the comparison of times as above pointed out to give the information required to the typewriter 35 for typing the report 37. In addition, the subroutines can also be used to simplify the operations required thereunder by skipping certain comparisons and questions.

Also the subroutine numbers allotted as herein disclosed make it possible for a complete usage of the computer capacity by having the subroutine automatically simplify the information required for the computer addresses. For example, the section 362 only uses column No. 1 and the spaces for columns Nos. 2, 3 and 4 are blank.

These uses of the subroutine numbers are mentioned to indicate the value of the subroutines in the overall operation of the computer 29.

It is readily apparent that the marks found on the typical tape 54 of FIG. 1D for the time channel causes the time-recording means of the computer 29 to count each one as the tape 54 is read. Thus, the time a train enters a section is the count existing when the train is indicated as entering a section, multiplied by the time represented by each count, and added to the initial time found in the write-in box. This is the reason for typing the initial write-in time into the computer. For example, when the passage of a switch is indicated as by marks 70 and 71 of FIG. 1D, the total number of time marks are four each representing 30 seconds or 2 minutes which added to the write-in time of 03:30:00 gives the time of 03:32:00 written in on the tape 54 of FIG. 1D. It is this time which is recorded by the computer immediately following the recordation of the passage of a switch as indicated by marks 70 and 71 of FIG. 1D. This is the time at which the train enters the section 361.

The train 420 is indicated on the tape of FIG. 1D as traveling forward by marks 42, 63, 64, 65, etc. The computer 29 of FIG. 2B includes in the processing area 32 suitable timing means to sense that the forward direction marks are repeatedly occurring, except when some other information is being stored, so that the forward direction is continually indicated. However, when such forward direction marks cease after the omission of one or more marks (when no other recordations are taking place) such timing means then indicates that the forward movement of the train has ceased. This causes the time of the cessation to be recorded in the computer and transferred to the typewriter through the computer output 34 for printing the elapsed time in the section 363 such as shown on the report 37 of FIG. 2D. Also the computer controls the typewriter to print the word "stopped" under the heading "question" on the report 37 as shown for section 363.

In the above description, it will be seen that the train number and times will be posted in FIG. 4A for each of the sections traveled. Such information is maintained until the typewriter 35 has completed its typed record, at which time the postings for the columns No. 00 and No. 6 will be cancelled so as to be in readiness for the processing of another tape for that particular area. The tape 54 of FIG. 1D must also be removed from the tape reader 30 in some suitable way making it ready for the next tape to be processed.

REAL TIME OPERATION

FIGS. 8A and 8B show respectively the apparatus associated with a locomotive and with a central office for effecting a real time record and indication of train movement through the respective track sections of the track layout of FIG. 1C. FIG. 8B shows means for supplying the computer with the train movements and the times involved which computer in turn controls a display panel which is shown in detail in FIG. 7.

FIG. 8A shows the locomotive as having the same detector apparatus as described above in connection with FIGS. 1A, 1B, 2A and 2C. Such apparatus can, of course, be of any suitable type equipment such as discussed above in connection with Pamphlet No. 1230 and applicant's prior application Ser. No. 771,825, filed Oct. 30, 1968. Detector coils 10 and 11 are respectively connected with amplifying apparatus 12 and 13. In this instance, however, the amplifiers 12 and 13 are directly connected to the communication transmitter 120.

In addition, the direction detector 25 is constructed exactly the same as discussed in connection with FIG. 2A and its contact 26 is operated in the same way. However, this motion detector 25 is directly connected to the communication transmitter 120 for supplying (+) through contact 26 depending upon the direction of train movement. In addition, there is a train number coder 123 which is also connected directly to the communication transmitter 120 for transmitting a code identifying the train. This is indicated, for convenience, as being train 420 as shown in FIG. 1A; but, it could, of course, just as well be train 422 as shown in FIG. 1B. The train number coder 123 causes the identity of the train to be transmitted for each transmission from the locomotive.

The communication system transmitter 120 suitably transmits the information from the locomotive to the central office for reception by the communication system receiver 121, and such system is of the type which transmits the information in substantially real time. Various kinds of systems can be employed.

For example, radio transmission can be employed which transmits a particular carrier frequency and which can have this carrier frequency modulated with distinctive tones for the different channels employed for the respective items of information. This particular frequency can be picked up at the central office for receiving the information and transmitting it to the temporary storage and interface 125. This temporary storage and interface 125 can also be controlled by other receivers which respond to different carrier frequencies so as to receive distinctive information from different locomotives. Such transmission is of course substantially instantaneous in its response and thus provides true real time information for the computer apparatus at the central office.

On the other hand, the communication system can be of the shared-time type where communication is established between the different locomotives one at a time in turn via suitable radio or wired carrier current apparatus. Although this time-shared type of transmission may consume finite times for its respective cycles of operation, such cycles would of course be of such short duration that the control of transmission between any particular locomotive and the central office would be substantially real time.

It is noted that FIG. 8A does not show a clock and its contact on the locomotive. This is because the information is transmitted immediately and the time that such information is received at the central office is sufficiently accurate for the purposes involved. More specifically, the clock 22 and its contact 23 are thus used at the central office in FIG. 8B for controlling the temporary storage and interface 125 so as to record the significant times of the reception of information from the locomotive shown in FIG. 8A and any other locomotives that may be employed.

This temporary storage and interface 125 is of the type which receives the information immediately from the communication receiver 121 and stores such information until it has been supplied to the computer input 31 and used therein. This is necessary because several locomotives may supply their information to the temporary storage 125 in rapid succession and such apparatus must process its information into the computer input for each such locomotive, one at a time.

The transmission of information from the locomotive is typically shown in FIG. 10 to illustrate the relative times of operation of the apparatus for transmission purposes. The codes shown are assumed to be typical of such transmissions.

As will be discussed later, the insertion of the train number and the time of its reporting into each track section will be distinctively shown on the display panel of FIG. 7, where a miniature reproduction of the actual track layout of FIG. 1C is reproduced in detail. Each track section has its number engraved on the panel immediately above the location of the display units for the train and the time. More specifically, the train display unit 126 has the train number 420 shown for the sake of definiteness. This display unit 126 would, of course, normally show zeros the same as the other train display units. The time display unit 127 is shown having the time 03:30:30 displayed therein for the sake of definiteness, but this display unit 127 would normally be blank the same as the other units. These various display units and their control will be discussed in greater detail later.

Let us assume that train 420 of FIG. 1A is entering track section 360 of FIG. 1C being equipped with the real time communication equipment as shown in FIG. 8A. The passage of the area coder unit 50 causes the pulses 143, 144, 145, 146 and 147 to be transmitted in succession for establishing the count. Simultaneously, pulses 140, 148, and 149 are transmitted as detected by coil 11 in passing the area coder unit 51. The net characteristics of these two sets of pulses supplies information to the communication system receiver 121 which in turn controls the temporary storage and interface 125 to establish that such receiver is supplying information for area designated 360, i.e., track section 360.

The mark 141 is a continuous transmission which is indicative of the forward direction. This is received by the receiver 121 and transferred to the temporary storage and interface 125. Nothing is transmitted over the reverse channel. However, the marks 142 are transmitted to establish the train number 420 is the code communication receiver 121 from which it is transferred to the temporary storage and interface 125.

The reception of these codes as the train moves over the area coder 360 establishes within the temporary storage and interface 125 that this code communication system receiver 121 is going to communicate information with regard to the area 360. The temporary storage 125 is connected to the computer input 31 for intermittently transferring any information then stored as received from the associated area, to that part of the computer associated therewith, such as shown in FIG. 4A.

In brief, the temporary storage 125 can receive and store messages for each of the several locomotives at any time; but it renders effective the communications received from each of the various locomotives, such as locomotive 420 over receiver 121, successively effective to supply information to the computer input 31 one at a time in turn. This means that if any information is received from any particular receiver between successive transfers of information, such information is held in the temporary storage 125 until the next time period allotted to transfer such information to the computer input.

Figure 9:
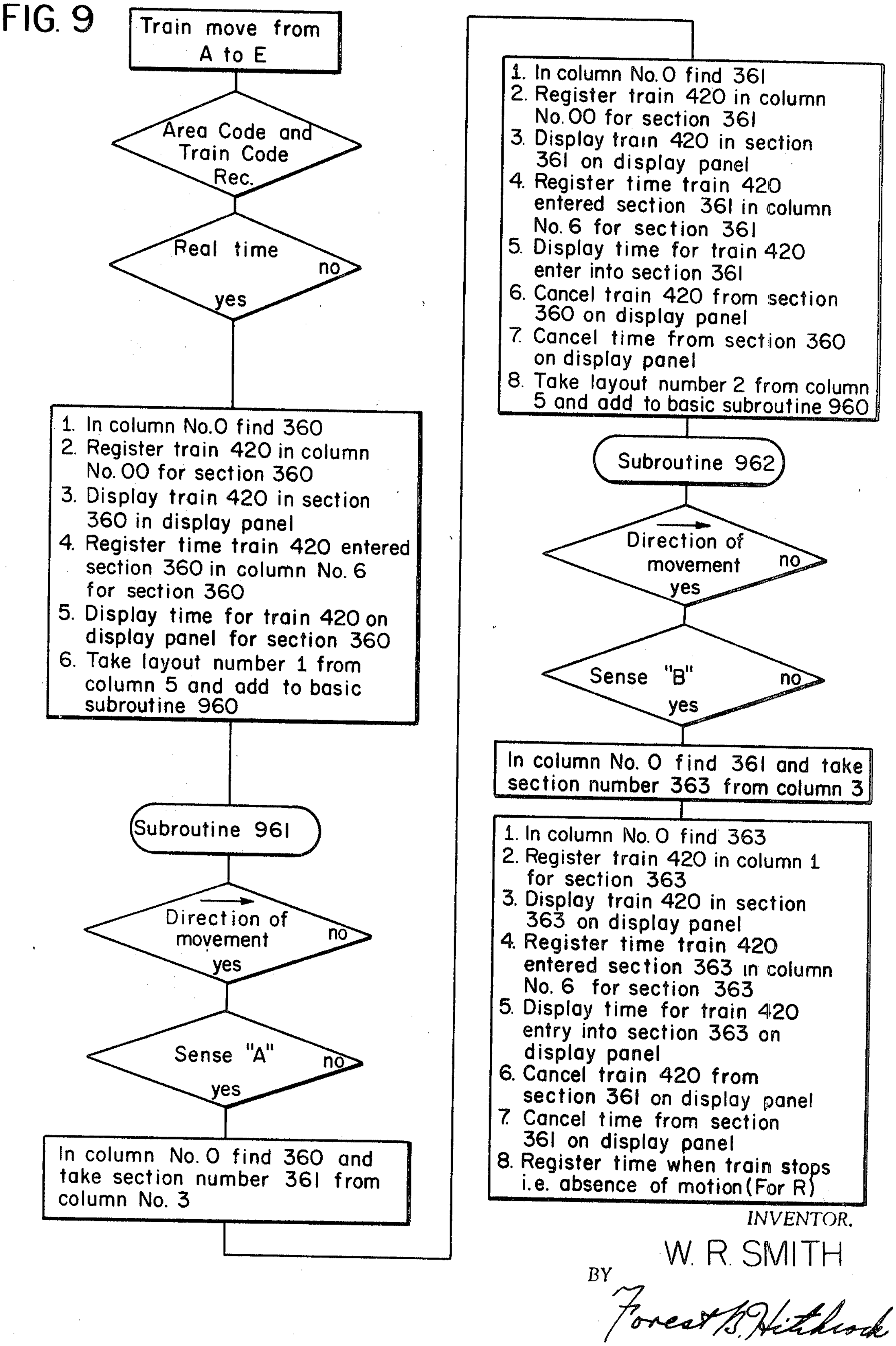
FIG. 9 is a block diagram or flow chart of the steps involved in the operation of the computer of FIG. 8B receiving inputs in real time from the transmitter of FIG. 8A on a train traveling a route from A to E in the layout of FIG. 1C.

Referring to FIG. 9 a flow chart for this real time operation indicates that the information is in real time. Thus, in column No. "0" of FIG. 4A, the location address for section 360 is found and the train number 420 is entered in column No. 1 for such section 360. Since real time is employed, the clock 22 and contact 23 are rendered effective to enter the time upon the receipt of such information which is then transferred to column No. 6 in the row for section 360. This is shown in FIG. 4B.

The display panel of FIG. 7 is connected to the computer addresses as shown in FIG. 8B for the area so that the occupied section will receive the train number as soon as it is posted in column No. 00 in FIG. 4B. Similarly, the time is entered on the display panel of FIG. 7 when it is posted for the section in column No. 6 of FIG. 4A, 4B, 4C, etc. In other words, the respective indicators such as 126 and 127 actually display what is posted in the appropriate columns for the appropriate sections. As previously mentioned, the 420 of display unit 126 and the time shown in display unit 127 are actually showed in FIG. 4B. FIGS. 4B, 4C and 4D are merely revisions of FIG. 4A to show the postings mentioned.

The layout number 1 is associated with track section 360 in FIG. 4A and this number added to the basic subroutine 960 indicates that the subroutine now to be followed is 961.

In due course, the marks 170 and 171 of FIG. 10 are received from the transmitter 120 by the receiver 121 of FIG. 8B since the detector "A" passes over the next switch in a straight-through train movement. The time of the reception of these marks is recorded from the clock 22. The direction is a forward mark 141 continuously transmitted and continuously received. Since such detection of these marks is for a right-hand direction by detector "A," it means that the section number 361 should be taken from column No. 3 of FIG. 4B. This indicates that the train 420 should have its number registered in column No. 00 for section 361 as shown in FIG. 4C. The time of reception of these marks is entered in column No. 6 of FIG. 4C.

The layout number 2 is in column No. 5 for section 361 which is added to the basic subroutine 960 to then specify that subroutine 962 is to be used. Since the next marks received are numbers 175 and 176 of FIG. 10 sensed by detector "B" of FIG. 8A; and, since the direction of movement is to the right, the two marks 175 and 176 indicate that the section 363 of column No. 4 should be selected for the entrance of the train 420. The train 420 is thus posted in column No. 00 for section 363 as shown in FIG. 4D. The time such marks 175 and 176 are received is then recorded in column No. 6 as shown in FIG. 4D.

Since no other marks are received from the train until a stop indication is given by the cessation of the transmission of forward mark 141, the time of such stoppage is recorded from the clock 22 and is suitably posted in the computer so that it can be transferred to the typewriter report if the train remains in section 363 for more than a predetermined time.

For the above description, it can be seen that the flow chart of FIG. 9 merely indicate the general function to be effected as proposed by the engineer designing the system; whereas, the actual machine programs for the subroutines and calculations mentioned must include various addition and subtraction operations, cancellations and the like, as required to effect the operations herein contemplated.

As can be seen in FIG. 4D, all of the data remains therein until the appropriate calculations have been performed and stored for transfer to the typewriter 35. For example, when the time has been entered in 361, the time for section 360 can be subtracted from it, which gives the time that the train has been in section 360 which amounts to 1 minute, 30 seconds, as indicated in the chart 37 operated by the typewriter 35. At that time, the standard time also associated with section 360 is similarly typed as 2 minutes. Since that is a reasonable difference, no questions are raised, with regard to it.

In addition, while the time for section 361 is still posted, the time for section 361 is subtracted from the time for section 363 which is 7 minutes which is suitably stored so as to be processed through the computer output to be typed into the time elapsed for section 361. Since the standard time is 60 minutes, the time consumed is over the standard time and the word "over" is printed on the report.

Although the above calculations are made and stored in the output area 34 of the computer 29, they are not transferred to the typewriter 35 until the train has either left the section 363 to the right and entered another area, or has stopped in section 363 for over a predetermined time. In any event when one of these two things occurs, the typewriter 35 is initiated for recording the previously recorded data as to the movement of the train from A to E in FIG. 1C. Also, cancellation of the data in the storage area or memory 33 of the computer 29 takes place. Specifically, the train numbers in column No. 00 will be cancelled and the times set in column No. 6 are also cancelled so that the computer 29 is in readiness for further operation.

It is noted that the display units 126, 127, etc. of FIG. 7 are directly controlled by the corresponding units for posting the train numbers and the times in FIG. 4A; but, if desired, the units of the display panel may be released in the rear of a train although the units of the memory of FIG. 4A are maintained in their existing positions for calculations later to be made prior to recording the information via the typewriter 35.

While there have been described what are at present considered to be the preferred embodiments of the invention, it will be obvious to those skilled in the art that various changes and modifications may be made therein without departing from the invention.

What I claim is:

1. A system for monitoring train movement over a railroad having convention track switches comprising;

a magnetic inductor including a body of ferromagnetic material located at particular points along the track, a plurality of magnetic detectors located at spaced points on said track for distinctively detecting the magnetic inductor upon the passage of said train over the magnetic inductor, and means controlled by said magnetic detectors for making a record of the passage of said train over said magnetic inductors.

2. A system as specified in the above claim 1 wherein said magnetic inductors comprise wayside located inert iron or ferromagnetic bodies for cooperating with the train-carried magnetic detectors located on opposite sides of the train.

3. A system as specified in the above claim 2, wherein said magnetic inductors comprise: a portion of each track switch including a single frog section, and wherein said magnetic detectors include at least one detector on each side of the train for detecting which side of the train passes over said frog section depending upon the position of the track switch.

4. A system as specified in claim 1, wherein said means controlled by said magnetic detectors includes a computer with a record of the sections of the track interconnected by said switches recorded therein to complete a record of the route travelled.

5. A system as specified in claim 1, in which an area marker is located to which said magnetic detectors respond for controlling said means to also make a record of said area.

6. A system for monitoring train movement over a railroad having track switches interconnecting various track sections, said track switches being operable to different positions to form different trackway routes, magnetic inductor means comprising a portion of the track switches including the diverging rails of said switches in either of its positions, electromagnetic means located on the train for supplying different outputs as a train passes over said magnetic inductors in a computer located at a central office, means for controlling said computer in response to said different outputs, a miniature track diagram including display units for said sections of track, and means controlled by said computer for acting on said display units to show the sections occupied by said train.

7. A system for monitoring train movement over a railway track layout having track switches interconnecting track sections comprising, said track switches being operable to different positions to form different trackway routes, magnetic inductor means comprising inert ferromagnetic bodies including a portion of the track switches, electromagnetic means located on the train for supplying different outputs as a train passes over said switches in different positions, a motion detector on said train for supplying different outputs for train movement in opposite directions, a computer located at a central office, means controlling said computer in response to said different outputs of said electromagnetic means and said motion detector, and means controlled by said computer for making a record of the route travelled by said train.

8. A system for monitoring train operation over a railroad having sections of track interconnected by switches comprising, magnetic inductors located at particular points along the track, a magnetic detector mounted on each side of a train and having windings thereon for supplying a distinctive output each time a detector passes over a switch or a magnetic inductor, means for storing said distinctive outputs for each said switch and each said magnetic inductor, a computer, means controlled by said storing means for supplying an input to said computer for all switches and magnetic inductors passed by said magnetic detectors, and means controlled by said computer for printing the route taken by the train.

9. A system for monitoring train operation over a railroad track layout having sections of track interconnected by track switches comprising, said track switches being operable to different positions to establish different routes through the track layout for the movement of trains, area markers of the magnetic type including a body of inert ferromagnetic material located at the entrance ends of said routes, each of said area markers having a distinctive code for its area, electrical means on a train being responsive to said area markers and to distinctively identify the passage of said train over each switch in its different positions, and storage means for storing said area codes and said passage of track switches in the succession in which they occur for recording the route for each train.

10. A system for monitoring train operation over a railroad track layout having sections of track interconnected by track switches comprising, said track switches being operable to different positions to establish different routes through the track layout for the movement of a train, an area marker including a body of inert ferromagnetic material located at the entrance end of a route, said marker providing a code distinctive of that area, motion detection means on the train responsive to the movement of the train to indicate its direction, electrical means on the train responsive to the distinctive code of said area marker and to distinctively identify the passage of said train over each switch in its different positions, and storage means for storing said area codes, the direction of motion of the train and the position of each track switch for recording the necessary information to identify the route taken by the train.

11. A system as specified in claim 7 wherein a time clock is included in the combination, and said means for controlling said computer also responds to said time clock for controlling said computer each time said different outputs are effective and wherein said means controlled by said computer makes a record of the route travelled by the train and the times the train passes said switches.

12. A system as specified in claim 8 wherein a clock is included in the combination for supplying the elapse of time to said storing means, said storing means also supplying an input to said computer for the elapse of time, and said computer also printing the time taken by the train to pass from said magnetic inductor to a switch as well as the time taken by the train to pass between any pair of the switches.

13. A system for monitoring train operation over a railway track layout having sections of track interconnected by track switches which are operable to different positions to form different trackway routes through the track layout comprising, a magnetic inductor including a body of ferromagnetic material located at the entrance of said track layout, a magnetic detector mounted on each side of a train and having windings thereon for supplying a distinctive output when said detector passes over said magnetic inductor and each time it passes over a succeeding track switch, a motion detector on said train for supplying different outputs for train movement in opposite directions, a computer at a central office with an associated time clock, means controlling said computer in response to said different outputs of said detector means and said motion detector for recording the passage of the train, said means also being responsive to said time clock for recording the time of occurrence of said different inputs and thus recording the times the train passes said magnetic inductor and the successive switches of track layout to comprise a route, and means controlled by said computer for making a printed record of the route travelled by said train and also including in the printed record the elapsed time for train movement between the successive switches.

14. A system as specified in claim 13 wherein said computer is originally set to include the standard elapsed time allotted for a train movement between each successive pair of track switches, said computer also causing the printing said standard elapsed times.

15. A system as specified in claim 14 wherein said computer includes means for comparing the train elapsed time with the standard elapsed time and advising when said train elapsed time is substantially greater than a standard elapsed time.

16. A system as specified in claim 6, wherein said display units for said track sections include units to identify trains and to give their times of arrival, and said means controlled by said computer for acting on said display units to show the identity of the train occupying corresponding sections of track and the times of arrival of said train.

17. A system as specified in claim 2 wherein said magnetic detectors are located on opposite sides of the train and said magnetic inductors include a portion of the track switches comprising the divergent rails of said switches in either of its positions for distinctive detection upon passage of the train over the switch.